(12) United States Patent
Hanson

(10) Patent No.: US 8,191,208 B2
(45) Date of Patent: Jun. 5, 2012

(54) LOAD SECURING RATCHET WITH ANCHOR ATTACHMENT SYSTEM

(76) Inventor: Burton W. Hanson, Anoka, MN (US)

( * ) Notice: Subject to any disclaimer, the term of this patent is extended or adjusted under 35 U.S.C. 154(b) by 367 days.

(21) Appl. No.: 12/480,037

(22) Filed: Jun. 8, 2009

(65) Prior Publication Data

US 2010/0064489 A1 Mar. 18, 2010

Related U.S. Application Data

(60) Provisional application No. 61/061,858, filed on Jun. 16, 2008, provisional application No. 61/059,491, filed on Jun. 6, 2008.

(51) Int. Cl.
*B65D 63/16* (2006.01)

(52) U.S. Cl. .................. 24/68 CD; 24/265 CD

(58) Field of Classification Search ................ 24/68 CD, 24/68 R, 68 CT, 68 B, 909, 71 ST, 265 R, 24/265 AL, 265 CD; 254/217, 218, 223, 254/237–239
See application file for complete search history.

(56) References Cited

U.S. PATENT DOCUMENTS

| | | | |
|---|---|---|---|
| 1,001,547 A | 8/1911 | McMillen | |
| 1,287,050 A | 12/1918 | Kranz | |
| 2,946,563 A | 7/1960 | Eaton | |
| 3,099,055 A | 7/1963 | Huber | |
| 3,409,263 A | 11/1968 | Jantzen | |
| 3,848,889 A | 11/1974 | Sharrow | |
| 3,988,007 A * | 10/1976 | Freiburger, Jr. | ............... 24/68 R |
| 4,155,537 A | 5/1979 | Bronson et al. | |
| 4,185,360 A | 1/1980 | Prete, Jr. et al. | |
| 4,199,182 A | 4/1980 | Sunesson | |
| 4,227,286 A | 10/1980 | Holmberg | |
| 4,324,022 A | 4/1982 | Prete, Jr. | |
| 4,570,305 A | 2/1986 | Smetz et al. | |
| 4,584,742 A | 4/1986 | Speich | |
| 4,912,813 A * | 4/1990 | Muller et al. | ............... 24/68 CD |
| 4,913,608 A | 4/1990 | Royball | |
| 5,058,243 A * | 10/1991 | Rasmussen | ................... 24/68 R |
| 5,156,506 A | 10/1992 | Bailey | |
| 5,271,606 A | 12/1993 | Kämper | |
| 5,426,826 A | 6/1995 | Takimoto | |
| 5,611,520 A | 3/1997 | Söderström | |
| 5,778,496 A | 7/1998 | Huang | |
| 5,832,569 A | 11/1998 | Berg | |
| 5,853,164 A | 12/1998 | Hunt | |

(Continued)

FOREIGN PATENT DOCUMENTS

DE 30 17 371 A1 11/1981

(Continued)

OTHER PUBLICATIONS

Highland™ The Pro's Brand catalog, "Cargo Management," pp. 2-31 (2003).

(Continued)

*Primary Examiner* — James Brittain
(74) *Attorney, Agent, or Firm* — Merchant & Gould P.C.

(57) ABSTRACT

An anchor attachment system is provided for use with tensioning device for tensioning lines, particularly belts or webs. The anchor attachment system releasably secures an anchoring line to one end of the tensioning device. Embodiments of the anchor attachment system employ a pin, a cross-pin, a spring element, and a locking cam working in cooperation to secure the pin to first and/or second ends of the tensioning device.

8 Claims, 20 Drawing Sheets

U.S. PATENT DOCUMENTS

| | | | |
|---|---|---|---|
| 5,904,341 A | 5/1999 | Norrby |
| 6,007,053 A | 12/1999 | Huang |
| 6,102,371 A | 8/2000 | Wyers |
| 6,139,234 A | 10/2000 | Huang |
| 6,195,848 B1 | 3/2001 | Jackson et al. |
| 6,279,847 B1 | 8/2001 | Berger |
| 6,322,302 B2 | 11/2001 | Horton |
| 6,398,470 B1 | 6/2002 | Mosley |
| 6,406,230 B1 | 6/2002 | Mason et al. |
| 7,207,089 B2 | 4/2007 | Hanson |

FOREIGN PATENT DOCUMENTS

| | | |
|---|---|---|
| EP | 0 311 828 A2 | 9/1988 |

OTHER PUBLICATIONS

Kinedyne Corporation catalog, "Kinedyne® Cargo Control Systems," pp. 2-43 (1996).

Kinedyne Corporation catalog, "Kinedyne® Cargo Control, Flatbed-Interior Van-Rail-Air," pp. various (2003).

Kinedyne Corporation Catalog No. CC300, "Kinedyne® Cargo Control Systems," pp. 2-55 (©2000).

Kinedyne Corporation Catalog No. KCP007, "Kinedyne® The Cargo Control People! Flatbed Trailer Products," pp. 2-11 (©2002).

SpanSet, Inc. Brochure, "Quality and Service. Our Commitment to You.," pp. 1-25 (©2002).

\* cited by examiner

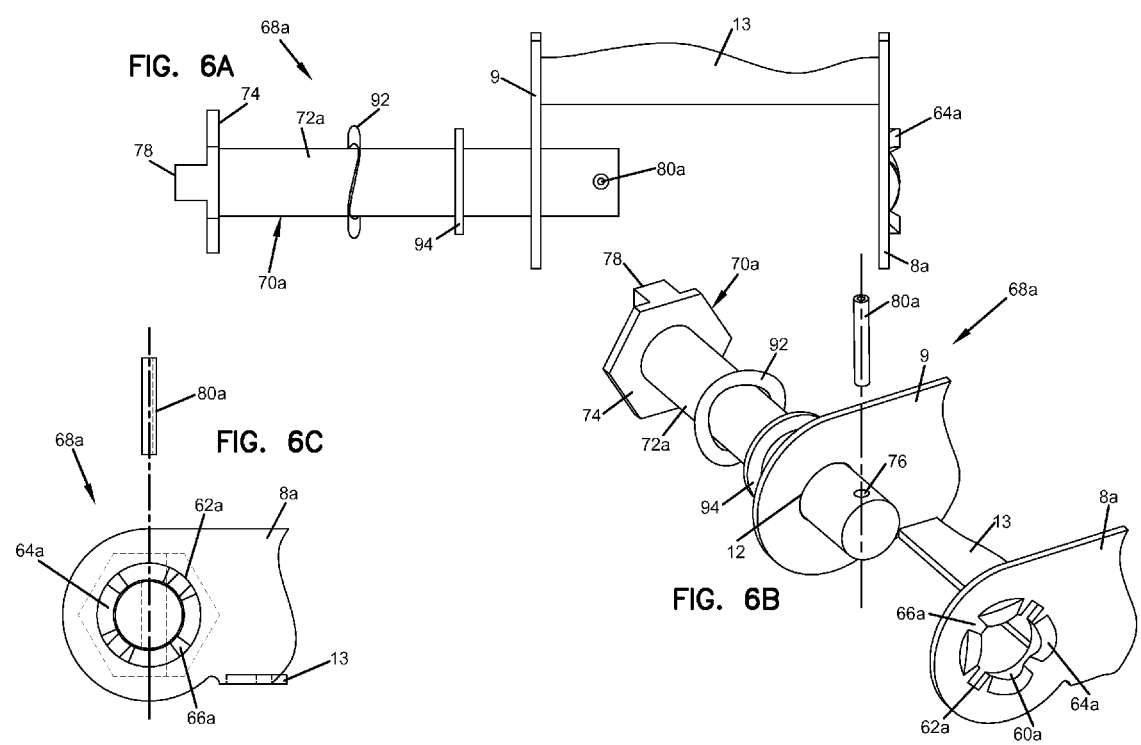

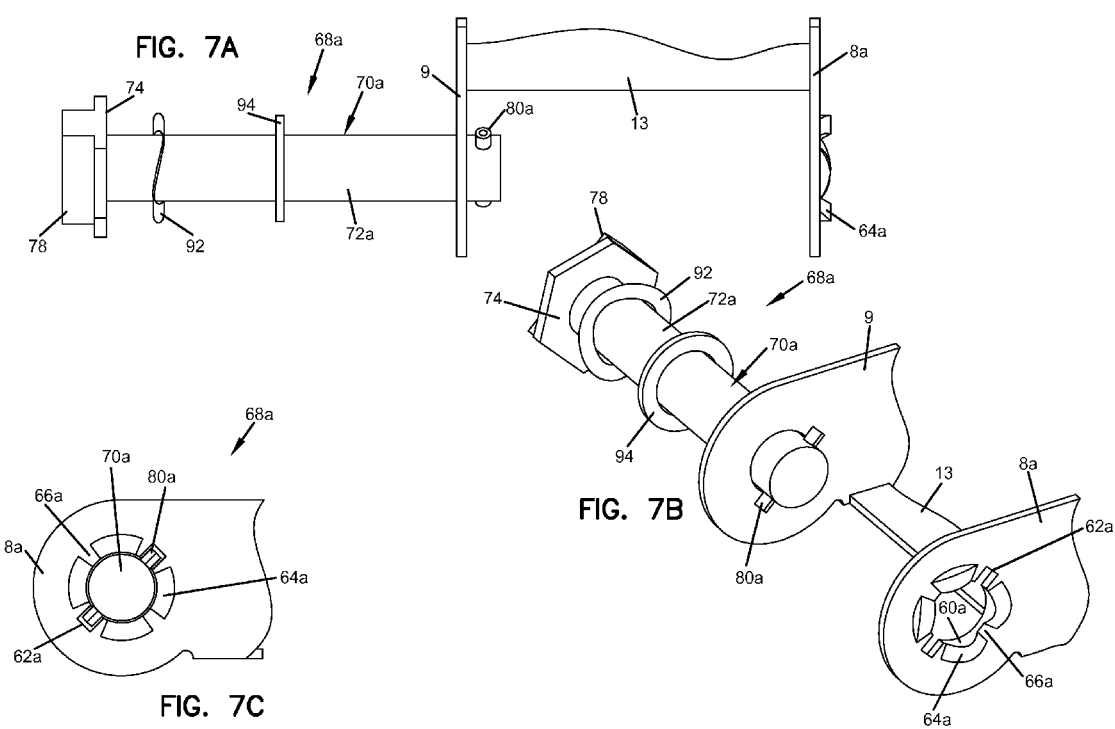

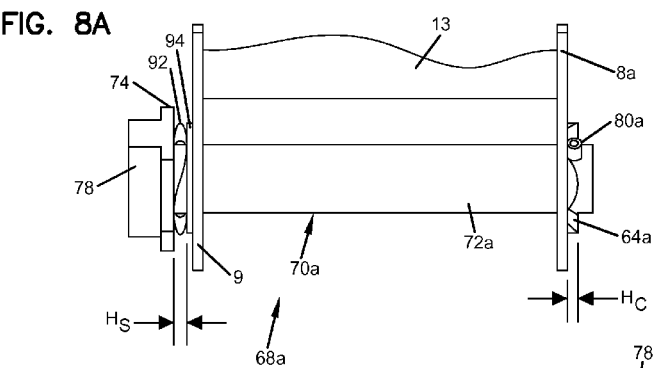
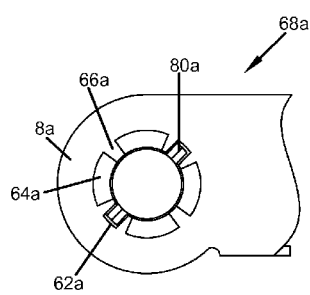
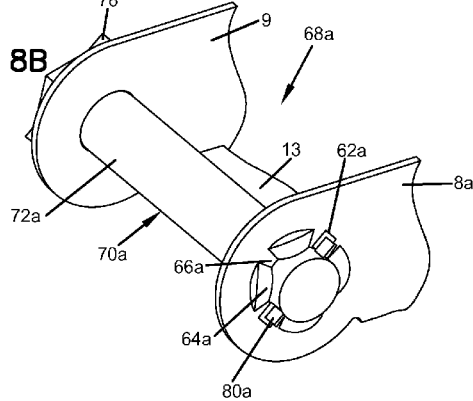

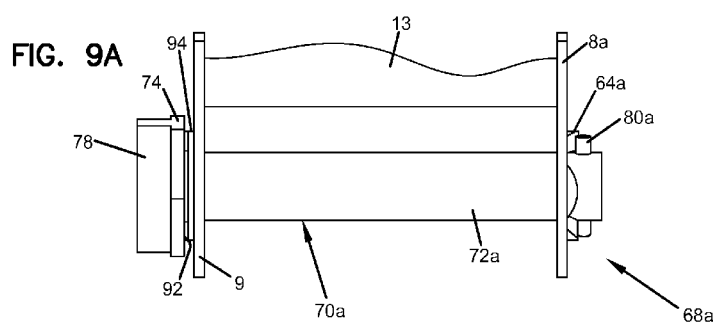
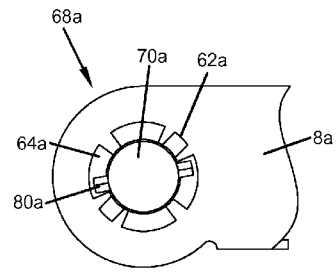
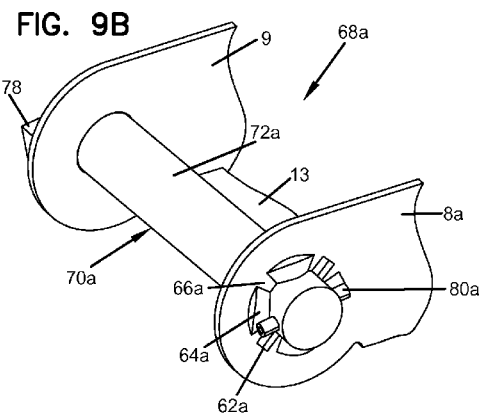

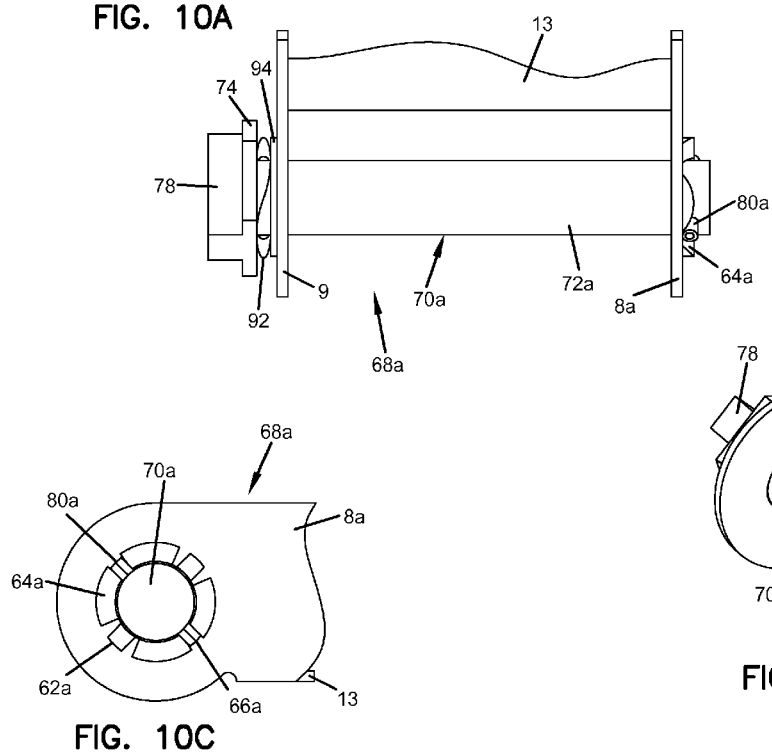

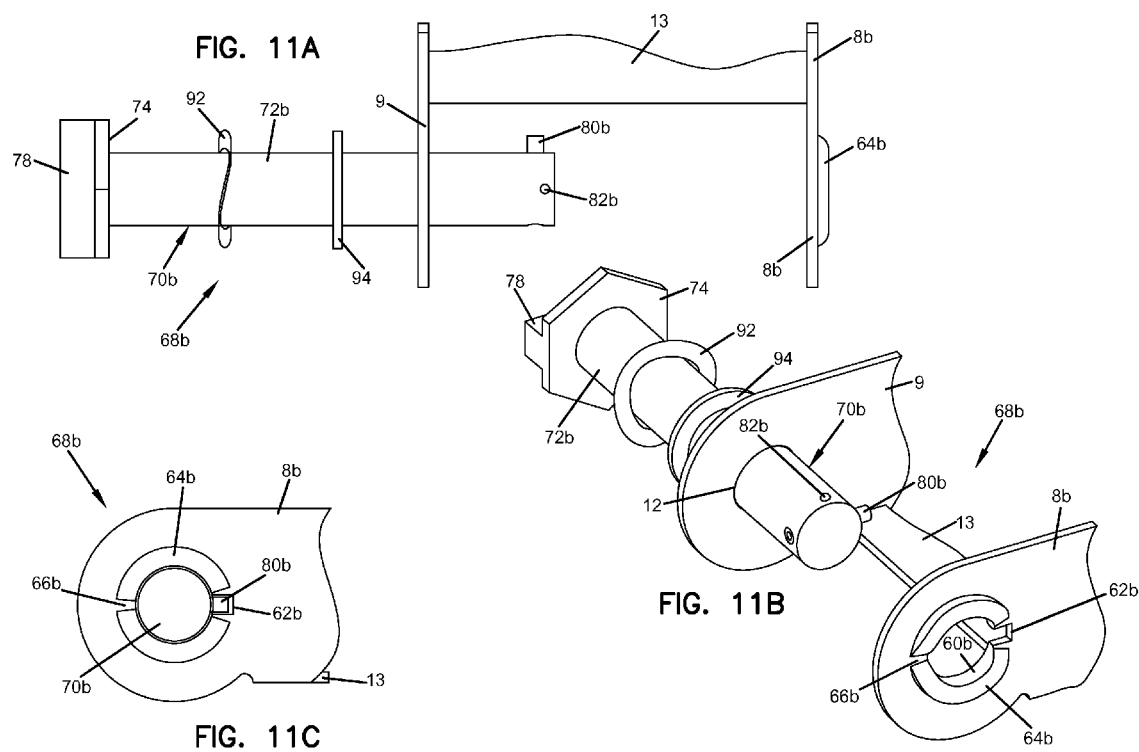

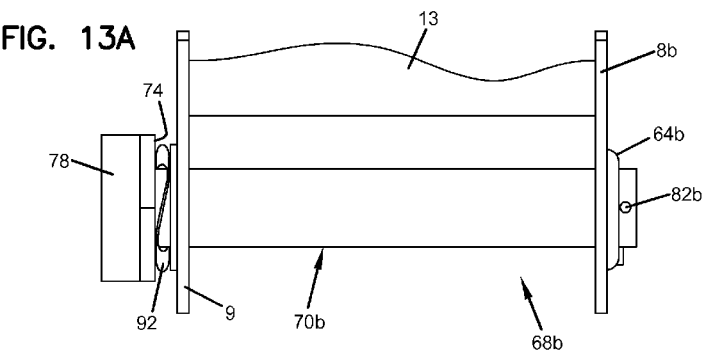

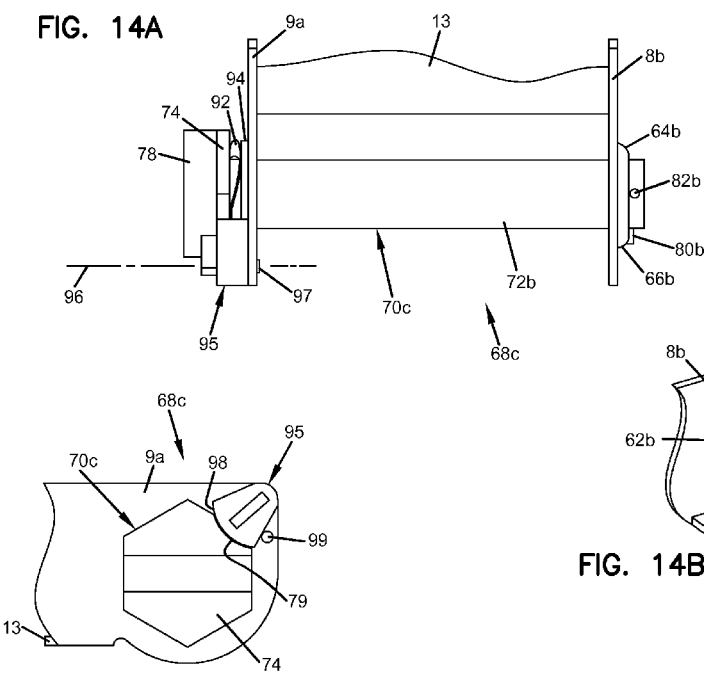
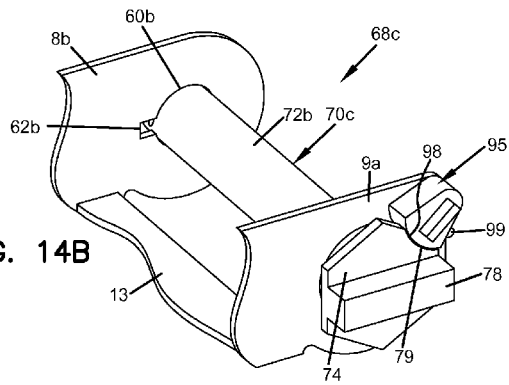
FIG. 14A
FIG. 14C
FIG. 14B

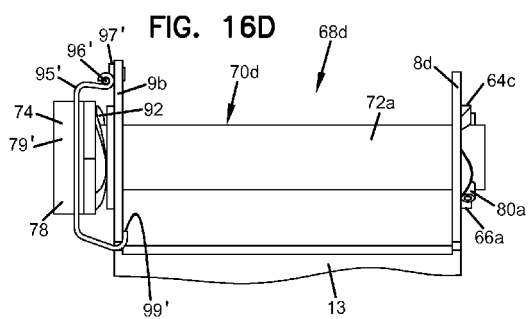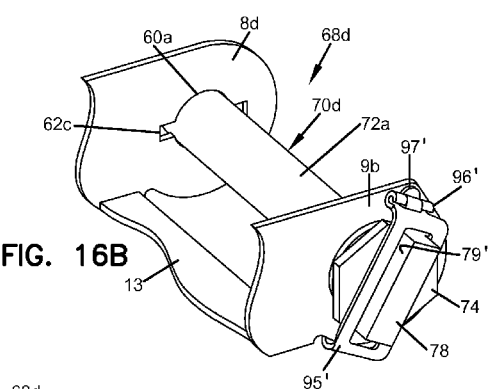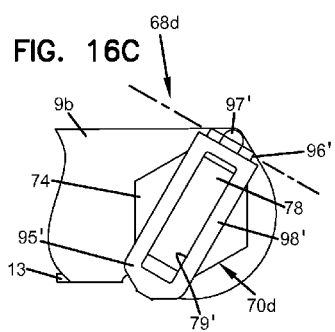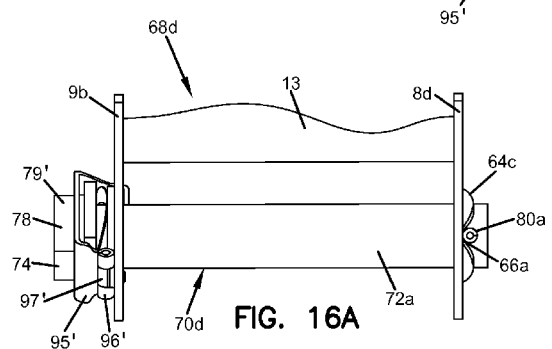

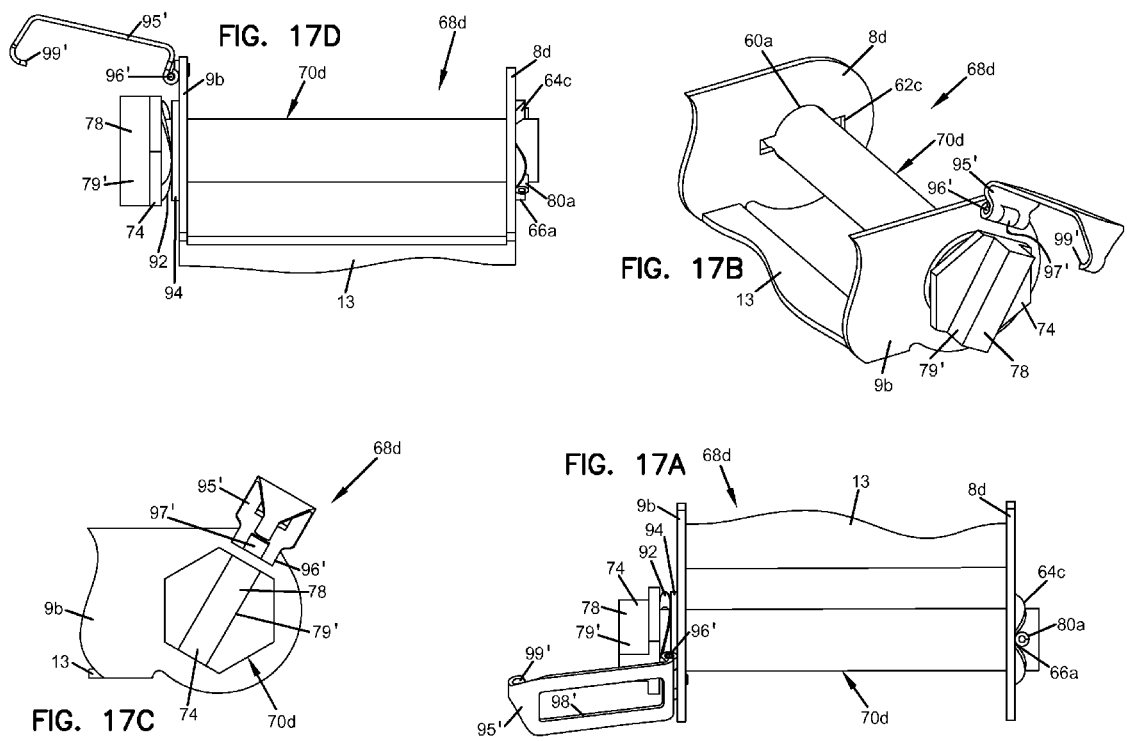

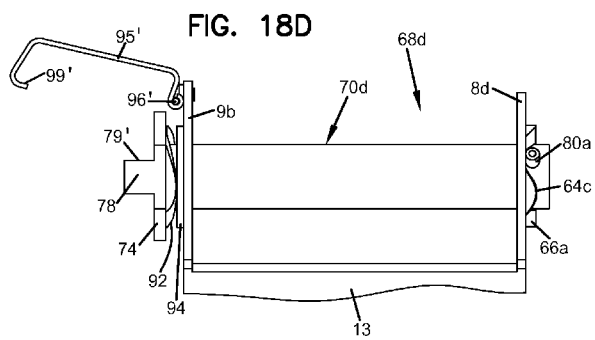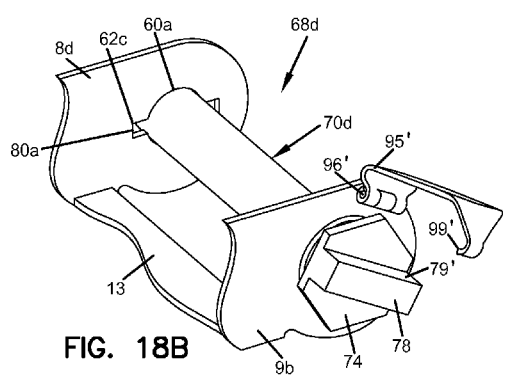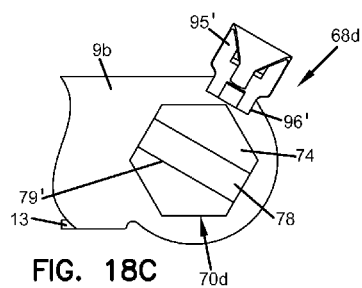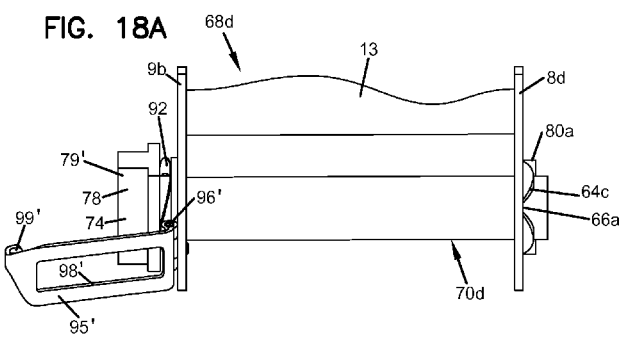

LOAD SECURING RATCHET WITH ANCHOR ATTACHMENT SYSTEM

CROSS-REFERENCES

This application claims the benefit of U.S. provisional application Ser. No. 61/061,858, filed Jun. 16, 2008; and U.S. provisional application Ser. No. 61/059,491, filed Jun. 6, 2008, both of which are titled "LOAD SECURING RATCHET WITH ANCHOR ATTACHMENT SYSTEM" and both of which are hereby incorporated herein by reference.

FIELD

The invention relates generally to a system for tensioning cargo retaining members to secure a load to a support surface.

BACKGROUND

Tensioning systems for tensioning lines, particularly belts or webs, utilizing a tensioning device to wind the tensioning lines have been used for many years. Systems of this type are typically comprised of an anchoring tensioning line, a threadable tensioning line, and a ratchet device. An example of an environment in which these types of devices are employed is in tightening lines around loads or cargo placed on semi-trailer flatbeds.

More specifically, prior art devices typically include a means to attach the proximal end of a first or anchoring tensioning line to a first end of the ratchet device and a ratchet system to wind the proximal end of a second or threadable tensioning line from the second end of the ratchet device. The distal end of the anchoring line is attached to a metal fastener such as a hook. The fastener attaches the anchoring line to one side of a support surface (e.g., one side edge of the flatbed trailer). The distal end of the threadable tensioning line also includes a metal faster such as a hook so that it can be fastened to the opposing side edge of the support surface (e.g., the second side edge of the flatbed trailer). The proximal end of the threadable tensioning line is placed over the vehicle load and threaded into the ratchet mechanism of the ratchet device.

The tensioning system of the ratchet device comprises a rotatable drive element serving to wind the threadable line, at least one ratchet wheel connected integrally in rotation to the drive element and exhibiting directionally oriented notches, and a pivot lever serving to introduce the rotary movement into the drive element, on which a drive pawl cooperating with the ratchet wheel is mounted slidably counter to the action of a spring, whilst the notches of the ratchet wheel are shaped so that they are retained firmly by a blocking pawl during movement of the pivot lever towards the first end of the device, whereas during the movement of the pivot lever towards the second end of the device, they are entrained via the drive pawl.

The means typically provided by the prior art tensioning systems for attaching the proximal end of the first anchoring tensioning line to the first end of the ratchet device includes a bolt, a nut, and, optionally, a sleeve mounted to holes at the first end of the ratchet device. Two wrenches are typically needed to remove the bolt and nut from the ratchet device. It is desired to remove the first anchoring tensioning line from the ratchet device without tools.

Therefore, there arises a need for a device to securely attach the proximal end of the first anchoring tensioning line to the first end of the ratchet device without tools. The present invention satisfies this and other needs.

SUMMARY

One aspect of the present disclosure relates to an anchor attachment system for use with load-securing tensioning devices. In one embodiment constructed according to the principles of the present disclosure, the load-securing tensioning device includes a tensioning device, an anchoring tensioning line, and a threadable tensioning line. The anchor attachment system facilitates efficient attachment and detachment of the anchoring line to and from the first end of the tensioning device.

In one embodiment of the present disclosure, the tensioning device includes an anchor member coupled to a first end of the tensioning device. The anchoring line may be removably attached to a first end of the tensioning device by a first anchor attachment. The threadable line is then fed thread-like into the tensioning device from a second end of the tensioning device that is remote from the attached anchoring line. In one embodiment, the tensioning device may include a second anchor attachment system mounted to the second end of the tensioning device to facilitate efficient attachment and detachment to and from the second end of the tensioning device.

In accordance with a further aspect of the present disclosure, there is provided a tensioning device for tensioning an anchoring line and a threadable line comprising: a first and second spaced parallel plate members; a rotatable drive element mounted between the plate members; a pivot lever mounted on the drive element; a drive pawl pivotably attached to the pivot lever; a first and second anchoring line attachment means interconnecting the first and second parallel plate members at remote ends of the device, wherein the anchor line may be removably attached by a first anchor attachment to either anchoring line attachment means; and a guide means serving to aid in winding the threadable line may include a second anchor attachment interconnecting the first and second spaced parallel plate members.

According to aspects of the disclosure, example embodiments of the anchor attachment system includes: a pin body; a spring element; an optional washer; and a cross-pin. The anchor attachment body comprises: a pin shaft for holding the anchoring line and/or guiding the threadable line, the pin shaft also engaging and mounting into a first and a second mounting hole within the respective first and second spaced parallel plate members; a pin head, at a first end of the pin body, connected to the pin shaft, the pin head including a grasp for manually rotating the pin; and a pin hole through the pin shaft proximate a second end of the pin body, opposite the first end, for removably mounting the cross-pin. The anchor attachment system relies upon and includes a set of locking cams and a set of key slots further included on the first spaced parallel plate member, further described below.

To employ the anchor attachment system in attaching the anchoring line or in guiding the threadable line, the spring element is first pre-installed on the pin shaft followed by the optional washer. In particular, an inner diameter of the spring element and optional washer are placed over an outer diameter of the pin shaft at the second end. The second end of the pin shaft is then inserted through the second mounting hole on the second spaced parallel plate member. Upon the cross-pin hole of the anchor attachment body arriving at a position between the first and second spaced parallel plate members, the cross-pin is inserted into the cross-pin hole and retained. The anchor attachment is retained in the second mounting hole on the second spaced parallel plate member by the insertion and retention of the cross-pin into the cross-pin hole by virtue of neither the pin head nor the retained cross-pin fitting through the second mounting hole.

After the anchor attachment is retained about the second mounting hole, the anchoring line or the threadable line are placed in a desired functional position around the pin shaft. To secure and retain the desired functional anchoring line or threadable line position, the second end of the pin shaft is further inserted into the first mounting hole on the first spaced parallel plate member. To accomplish this insertion, the cross-pin is first aligned with a set of keys included around the first mounting hole. After this insertion, the cross-pin is positioned between the set of locking cams adjacent the first mounting hole, and the spring element and optional washer are nestled between the pin head and the second spaced parallel plate member.

To secure and lock the anchor attachment to the first and second spaced parallel plate members and thereby securely attach the anchoring line to the tensioning device or guide the threadable line about the tensioning device, the pin body is rotated along its axis, preferably by manually turning the grasp of the pin head. Rotating the pin body causes the cross-pin to engage the set of locking cams thereby axially moving the pin head towards the second spaced parallel plate member. This axial movement is resisted by the spring element, and the spring element is compressed by the axial movement. Further rotating of the pin body causes the cross-pin to reach and engage a valley between the set of locking cams. The valley allows the spring element to axially pull the pin body thereby axially moving the pin head away from the second spaced parallel plate member. This axial movement is induced by the spring element, and the spring element is uncompressed by the axial movement.

After the cross-pin is positioned and engaged at the valley between the set of locking cams, the anchor attachment is locked into position and any incidental rotational torque on the pin body is resisted by the cross-pin reengaging the set of locking cams and thereby the spring element.

The anchor attachment may be disengaged by manually turning the grasp of the pin head thereby causing the reengagement of the locking cams by the cross-pin. Upon the cross-pin reaching the set of keys, the anchor attachment may be pulled back through and disengaged from the first mounting hole on the first spaced parallel plate member. Upon the disengagement of the anchor attachment from the first mounting hole, the anchoring line or threadable line may be removed and/or repositioned.

To further secure the anchor attachment and, in particular, to further prevent the rotation of the anchor attachment body, certain embodiments of the present disclosure include a pin-keeper. In an example embodiment, the pin-keeper is rotatably mounted on the first spaced parallel plate member and rotatably moves from a latched position to an unlatched position. A pin head engaging surface on the pin-keeper engages a latching surface on the pin head when the pin-keeper is in the latched position. While in the latched position, the pin head engaging surface of the pin keeper interferes with rotational movement of the pin head and therefore the pin body. By preventing rotational movement of the pin body, the cross-pin remains engaged within the valley between the set of locking cams which prevents the anchor attachment from being disengaged from the tensioning device.

To disengage the anchor attachment from the tensioning device equipped with the example pin-keeper, the pin-keeper is rotatably moved to an unlatched position such that the pin head engaging surface no longer engages the latching surface of the pin head nor interferes with the rotation of the pin body. In this configuration, the anchor attachment may be removed from the tensioning device as described above.

In a preferred embodiment of the present disclosure wherein the system includes the pin-keeper, the pin-keeper is spring loaded into the latched position and is stopped at the latched position by a keeper stop. The pin-keeper may be manually moved into the unlatched position from the latched position by overcoming the spring force.

While the invention will be described with respect to preferred embodiment configurations and with respect to particular components used therein, it will be understood that the invention is not to be construed as limited in any manner by either such configuration or components described herein. Further, while the preferred embodiments of the invention will be generally described in relation to securing a cargo or load on a semi-trailer flatbed, it will be understood that the scope of the invention is not to be so limited to that particular environment. For example, the device may be utilized in other representative environments such as ocean transport, inside boxcars, airplanes, trucks and vans. Further, the device may be used to secure wood, pipes, in agricultural environments, etc. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawing which forms a part hereof and to the accompanying descriptive matter, in which there is illustrated and described a preferred embodiment of the invention.

BRIEF DESCRIPTION OF THE DRAWINGS

Referring to the drawings, wherein like numerals represent like parts throughout the several views:

FIG. 6A is a partial top view of an example attachment arrangement for securing an anchoring tensioning line to a tensioning device, the first example attachment arrangement including a first attachment member inserted into a first attachment hole of the tensioning device in accordance with the principles of the present disclosure;

FIG. 6B is a partial perspective view of the example attachment arrangement of FIG. 6A showing a first example locking cam of the tensioning device and showing a cross-pin aligned with the first attachment member in accordance with the principles of the present disclosure;

FIG. 6C is a partial elevation view of the example attachment arrangement of FIG. 6B in accordance with the principles of the present disclosure;

FIG. 7A is a partial top view of the example attachment arrangement of FIG. 6A including a cross-pin inserted into the first attachment member wherein the first attachment member and the cross-pin are aligned with a second attachment hole of the tensioning device in accordance with the principles of the present disclosure;

FIG. 7B is a partial perspective view of the example attachment arrangement of FIG. 7A including a first locking cam in accordance with the principles of the present disclosure;

FIG. 7C is a partial elevation view of the example attachment arrangement of FIG. 7A in accordance with the principles of the present disclosure;

FIG. 8A is a partial top view of the example attachment arrangement of FIG. 7A in which the first attachment member has been inserted through the first attachment hole and the second attachment hole of the tensioning device in accordance with the principles of the present disclosure;

FIG. 8B is a partial perspective view of the example attachment arrangement of FIG. 8A in which the first attachment member is oriented to position the cross-pin in a first, inserted position in accordance with the principles of the present disclosure;

FIG. 8C is a partial elevation view of the example attachment arrangement of FIG. 8A in accordance with the principles of the present disclosure;

FIG. 9A is a partial top view of the example attachment arrangement of FIG. 8A in which the first attachment member has been inserted through the first and second attachment holes of the tensioning device and in which the cross-pin is sliding over a locking cam in accordance with the principles of the present disclosure;

FIG. 9B is a partial perspective view of the example attachment arrangement of FIG. 9A in accordance with the principles of the present disclosure;

FIG. 9C is a partial elevation view of the example attachment arrangement of FIG. 9A in accordance with the principles of the present disclosure;

FIG. 10A is a partial top view of the example attachment arrangement of FIG. 9A in which the cross-pin has been arranged in a second, locked position in accordance with the principles of the present disclosure;

FIG. 10B is a partial perspective view of the example attachment arrangement of FIG. 10A in accordance with the principles of the present disclosure;

FIG. 10C is a partial elevation view of the example attachment arrangement of FIG. 10A in accordance with the principles of the present disclosure;

FIG. 11A is a partial top view of another example attachment arrangement including another cross-pin inserted into another example attachment member that has been inserted into a first attachment hole of the tensioning device in accordance with the principles of the present disclosure;

FIG. 11B is a partial perspective view of the example attachment arrangement of FIG. 11A showing a second example locking cam on the tensioning device in accordance with the principles of the present disclosure;

FIG. 11C is a partial elevation view of the example attachment arrangement of FIG. 11A showing the first attachment member and the cross-pin aligned for insertion through a second opening and past the second locking cam of the tensioning device in accordance with the principles of the present disclosure;

FIG. 13A is a partial top view of the example attachment arrangement of FIG. 12A in which the first attachment member is arranged to position the cross-pin in a second orientation to engage the cross-pin with the second example locking cam in accordance with the principles of the present disclosure;

FIG. 13B is a partial perspective view of the example attachment arrangement of FIG. 13A in accordance with the principles of the present disclosure;

FIG. 13C is a partial elevation view of the example attachment arrangement of FIG. 13A in accordance with the principles of the present disclosure;

FIG. 14A is a partial top view of another example attachment arrangement for securing an anchoring tensioning line to a tensioning device, the example attachment arrangement including another first attachment member inserted through a first and a second attachment hole of the tensioning device, oriented in a locked position, and secured by a keeper arrangement, which is arranged in a latched position in accordance with the principles of the present disclosure;

FIG. 14B is a partial perspective view of the example attachment arrangement of FIG. 14A in accordance with the principles of the present disclosure;

FIG. 14C is a partial elevation view of the example attachment arrangement of FIG. 14A in accordance with the principles of the present disclosure;

FIG. 16A is a partial top view of still another example attachment arrangement including yet another first attachment member inserted through a first and a second attachment hole of a tensioning device, arranged in a locked position, and secured in the locked position by another example keeper arrangement, which is arranged in a latched position in accordance with the principles of the present disclosure;

FIG. 16B is a partial perspective view of the example attachment arrangement of FIG. 16A in accordance with the principles of the present disclosure;

FIG. 16C is a partial elevation view of the example attachment arrangement of FIG. 16A in accordance with the principles of the present disclosure;

FIG. 16D is a bottom view of the example attachment arrangement of FIG. 16A in accordance with the principles of the present disclosure;

FIG. 17A is a partial top view of the example attachment arrangement of FIG. 16A in which the keeper arrangement is arranged in an unlatched position in accordance with the principles of the present disclosure;

FIG. 17B is a partial perspective view of the example attachment arrangement of FIG. 17A in accordance with the principles of the present disclosure;

FIG. 17C is a partial elevation view of the example attachment arrangement of FIG. 17A in accordance with the principles of the present disclosure;

FIG. 17D is a bottom partial view of the example attachment arrangement of FIG. 16A in accordance with the principles of the present disclosure;

FIG. 18A is a partial top view of the example attachment arrangement of FIG. 16A in which the first attachment member of the attachment arrangement has been inserted through the first and second attachment holes of the tensioning device and arranged in an unlocked configuration, the keeper arrangement shown in an unlatched position in accordance with the principles of the present disclosure;

FIG. 18B is a partial perspective view of the example attachment arrangement of FIG. 18A in accordance with the principles of the present disclosure;

FIG. 18C is a partial elevation view of the example attachment arrangement of FIG. 18A in accordance with the principles of the present disclosure;

FIG. 18D is a partial bottom view of the example attachment arrangement of FIG. 18A in accordance with the principles of the present disclosure.

DETAILED DESCRIPTION

Figure 1:
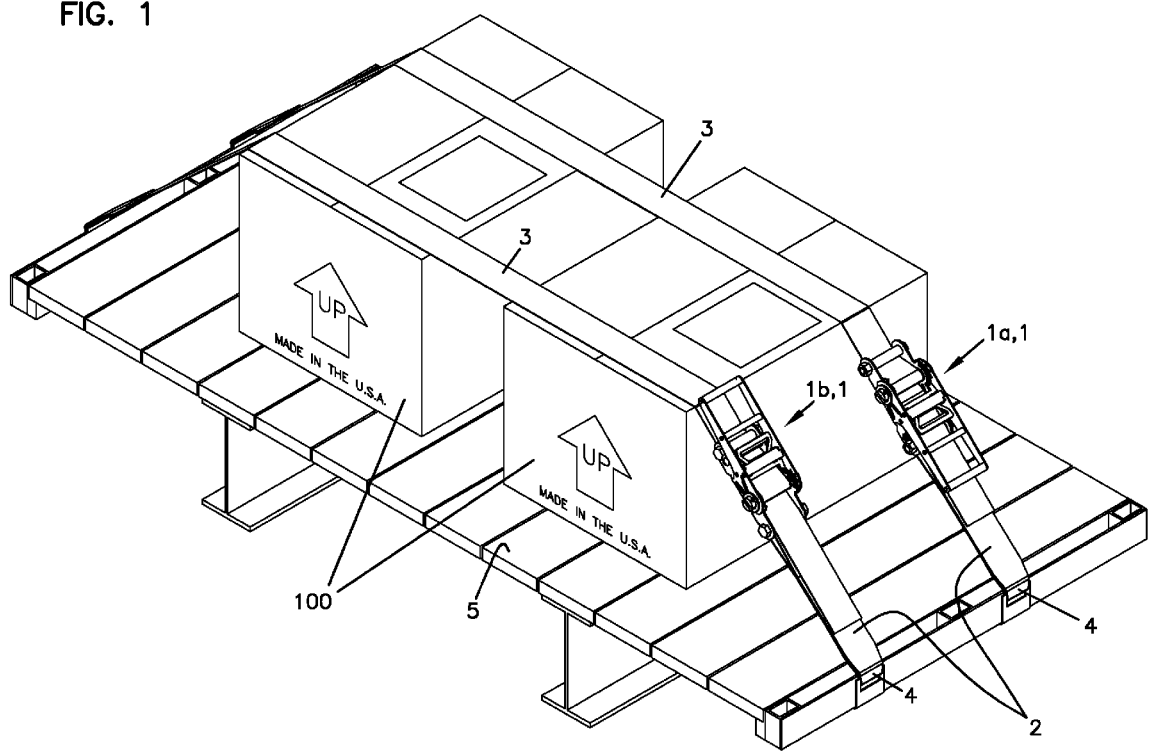
FIG. 1 shows a bi-directional load securing ratchet method and apparatus system (including a bi-directional tensioning device, a anchoring line, and a threadable line) securing a load to a surface in accordance with the principles of the present disclosure.

This disclosure is directed to an attachment system for use with a tensioning device and, in particular, for use with a ratcheting tensioning device. One example of a ratcheting tensioning device includes a bidirectional tensioning device, such as the bidirectional tensioning devices 1a, 1b, which are illustrated in FIGS. 1 through 5. Another example of a ratcheting tensioning device includes a non-bidirectional tensioning device. Bidirectional and non-bidirectional ratcheting tensioning systems are described in detail in U.S. Pat. No. 7,207,089, issued Apr. 24, 2007, which is hereby incorporated by reference in its entirety.

As a brief summary of the bidirectional ratcheting tensioning systems 1a, 1b, illustrated in FIGS. 1 through 5, the tensioning systems 1a, 1b each include a first attachment member 105 positioned at a first end of the tensioning device and a second attachment member 106 positioned at a second end of the tensioning device. Each of the attachment members 105, 106 is configured to selectively couple with the proximal end of the anchoring line 2. Each tensioning device 1a, 1b is configured to selectively couple to the proximal end of the threadable line 3. The second end of the tensioning device 1b is coupled with the proximal end of the anchoring line 2. In either case, the distal ends of the anchoring line 2 and the threadable line 3 are each attached to the support surface 5 by means of a fastener 4 such as a hook. The threadable line 3 extends over a load 100 to secure the load 100 to the support surface 5.

In the case of the bidirectional ratcheting tensioning systems 1a, 1b, the components between the devices 1a and 1b are identical but the anchoring line 2 is connected at the opposite end of the device 1a versus the device 1b. Therefore, if the device 1a and 1b is desired to be converted and/or utilized in the other manner, the device 1a, 1b merely needs to be turned around 180 degrees, the anchoring line 2 attached to the other end of the device 1a and 1b, and the threadable line 3 also threaded from the reverse end.

The disconnection and reattachment of the anchoring line 2 and the threadable line 3 when converting the device 1a, 1b is facilitated by employing an embodiment of an anchor attachment system (e.g., attachment systems 68a, 68b, 68c, 68d) having features that are examples of inventive aspects of the principles of the present disclosure. Accordingly, the benefits provided by the bidirectional ratcheting tensioning systems 1a, 1b may be enhanced by the inclusion of an embodiment of the attachment system.

In general, to remove an anchoring line 2 from a first anchor member of the tensioning device, a first anchor attachment system (e.g., see anchor attachment system 300 of FIG. 20) is configured into an unlocked state, the first anchor member is at least partially detached from the tensioning device, and the anchoring line 2 is removed (e.g., slid off) from the first anchor member. The first anchor member can be reattached to the tensioning device and the anchor attachment system can be configured into the locked state after the anchoring line 2 is removed.

To convert a bidirectional tensioning device, a second anchor attachment system (e.g., see anchor attachment system 400 of FIG. 20) of the tensioning device can be configured into an unlocked state, the second anchor member can be at least partially detached from the tensioning device, and the anchoring line 2, which was previously removed from the first anchor member, can be slid onto the second anchor line. The second anchor member can be reattached to the tensioning device and the second anchor attachment system can be configured into the locked state.

Embodiments of the anchor attachment system can include an anchor member (e.g., one of anchor members 105, 106 of FIG. 2A) configured to releasably engage the body of the tensioning device. In one embodiment, a first end of the anchor member includes a keeper (e.g., a roll pin) and the body of the tensioning device defines a locking formation configured to releasably hold the keeper at a particular location and/or in a particular orientation. For example, the locking formation can include a cammed protrusion and the keeper can include a roll pin configured to slide over the cammed protrusion.

Figure 15A:
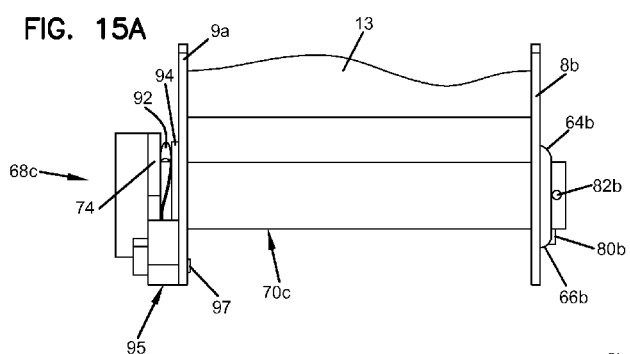
FIG. 15A is a partial top view of the example attachment arrangement of FIG. 14A in which the keeper arrangement is arranged in an unlatched position in accordance with the principles of the present disclosure.
Figure 15C:
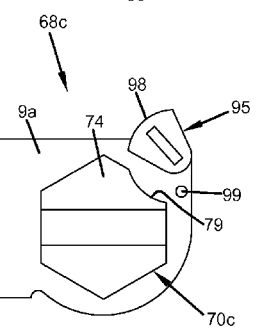
FIG. 15C is a partial elevation view of the example attachment arrangement of FIG. 15A in accordance with the principles of the present disclosure.

In some embodiments, the opposite end of the anchor member includes a retaining member. The retaining member inhibits rotation of the anchor member. In one embodiment, the retaining member pivots into and out of engagement with a cammed surface of the anchor member (e.g., see FIGS. 15A-15C). In another embodiment, the retaining member moves into and out of surrounding engagement with a portion of the anchor member (e.g., see FIGS. 16A-16D). For example, the retaining member defines an aperture through which the portion of the anchor member protrudes when the retaining member engages the anchor member.

In another embodiment, the retaining member includes a biasing member biases the anchor member in a first direction, but enables the anchor member to be pushed in the opposite direction (e.g., see FIGS. 11A-11C). In one embodiment, the biasing member is a wave washer. In another embodiment, the biasing member is a spring. The biasing member facilitates locking of the anchor member by biasing the keeper into engagement with the locking formation. The biasing member also enables the keeper to be released from the locking formation. For example, the user may slide the anchor member against the bias of the biasing member, thereby releasing the keeper from the locking formation.

Example embodiments of an anchor attachment system are illustrated in FIGS. 6A through 18D. In these example embodiments, the example attachment systems 68a, 68b, 68c, 68d include: a pin body 70a, 70b, 70c, 70d; a spring element 92; an optional washer 94; and a cross-pin 80a, 80b. The attachment system 68a, 68b, 68c, 68d includes a set of locking cams 64a, 64b, 64c and a set of key slots 62a, 62b, 62c defined on the first spaced parallel plate member 8a, 8b, 8c, 8d as described herein.

Figure 3:
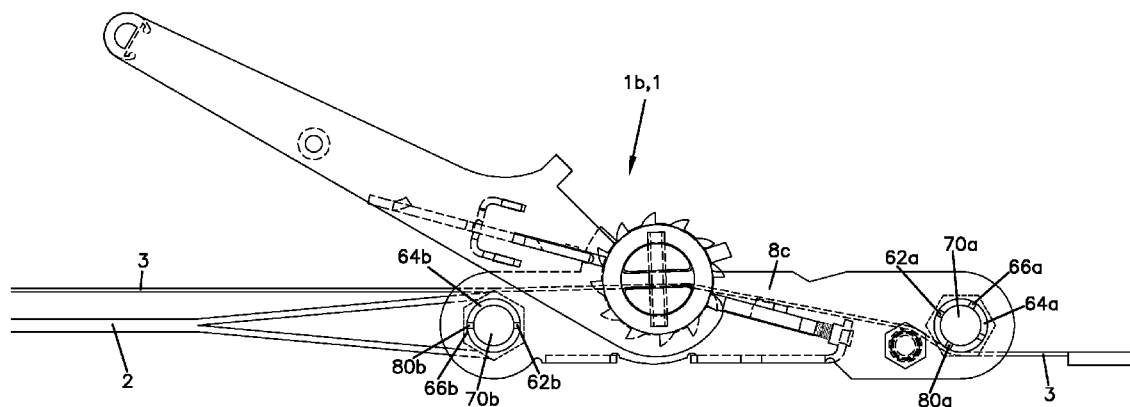
FIG. 3 is a schematic side view of an example of the device of FIG. 1 including a first attachment system, which includes a pair of attachment members in accordance with the principles of the present disclosure.
Figure 4A:
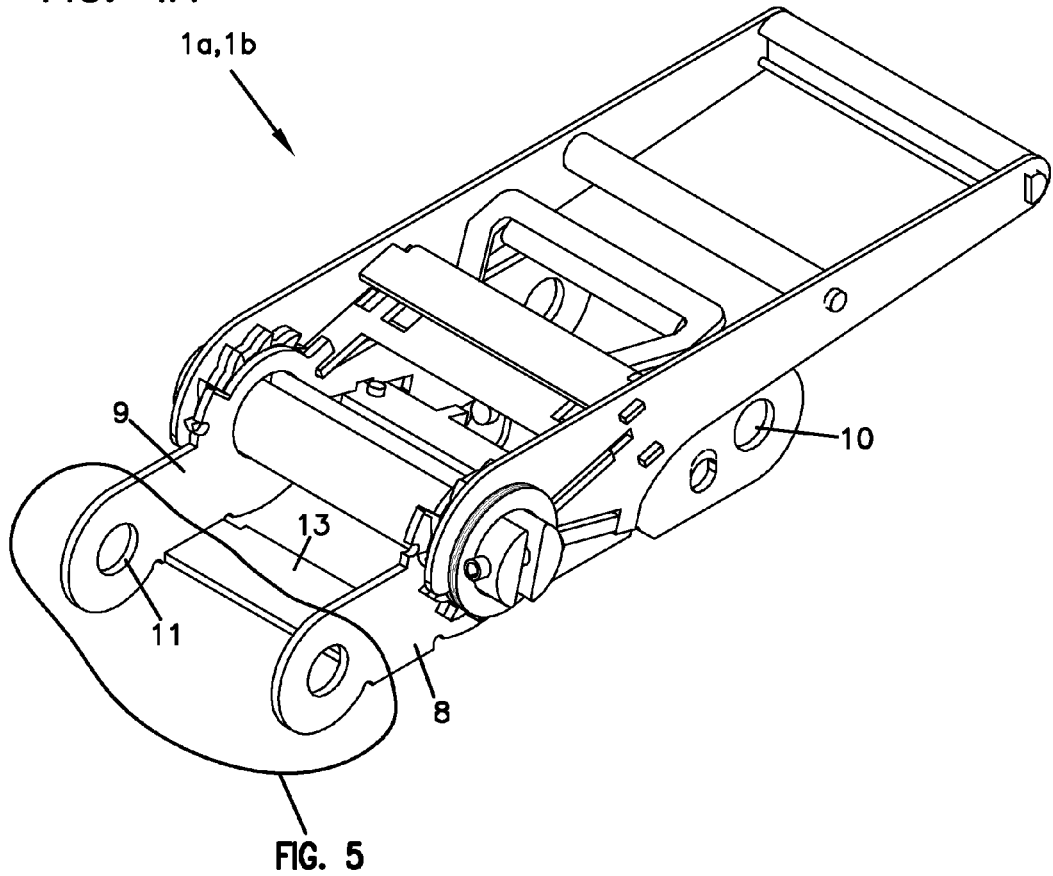
FIG. 4A is a perspective view of an example of the bi-directional tensioning device of FIG. 1 in accordance with the principles of the present disclosure.
Figure 4B:
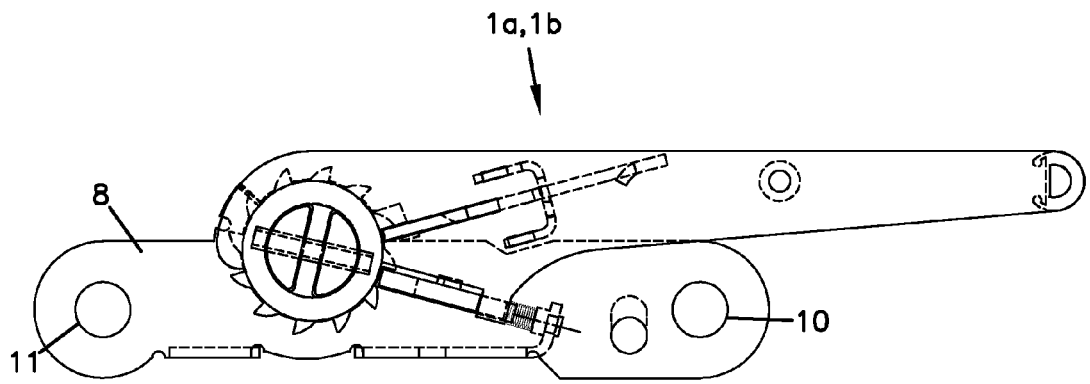
FIG. 4B is an elevational side view of an example of the tensioning device of FIG. 1 with portions shown in phantom in accordance with the principles of the present disclosure.
Figure 5:
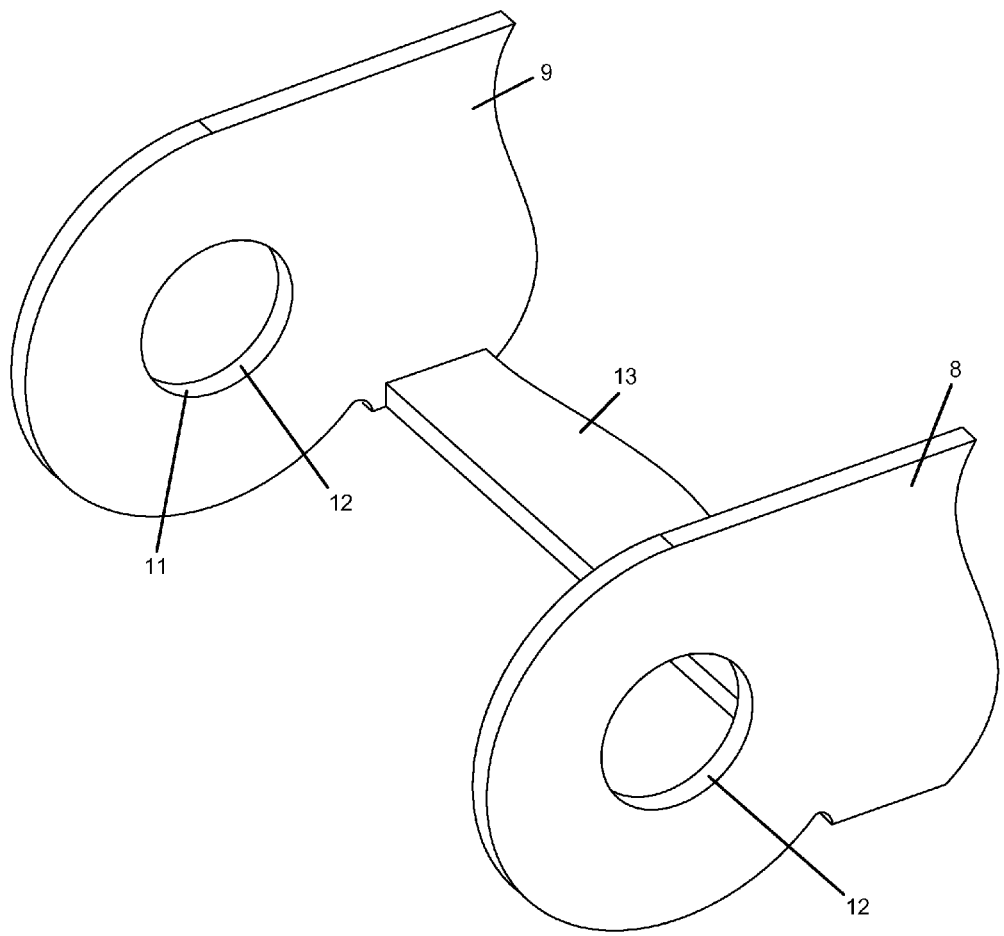
FIG. 5 is a partial perspective view of the tensioning device taken from FIG. 4A in accordance with the principles of the present disclosure.
Figure 12A:
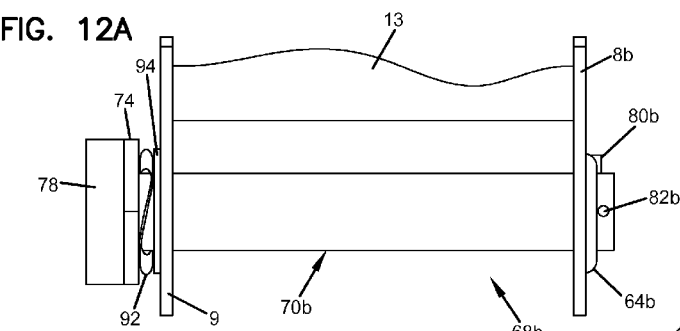
FIG. 12A is a partial top view of the example attachment arrangement of FIG. 11A in which the first attachment member has been inserted through the first attachment hole and the second attachment hole of the tensioning device in accordance with the principles of the present disclosure.
Figure 12B:
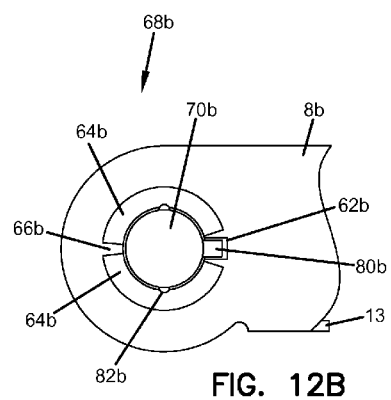
FIG. 12B is a partial perspective view of the example attachment arrangement of FIG. 12A in which the first attachment member is arranged to position the cross-pin in a first orientation to facilitate passing the cross-pin through the second hole in accordance with the principles of the present disclosure.
Figure 12C:
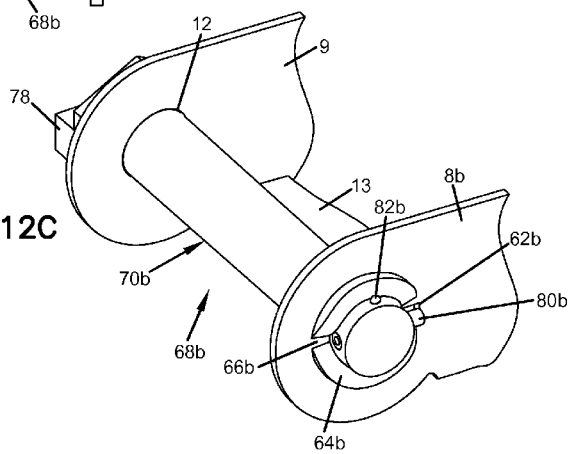
FIG. 12C is a partial elevation view of the example attachment arrangement of FIG. 12A in accordance with the principles of the present disclosure.

The pin body 70a, 70b, 70c, 70d includes a pin shaft 72a, 72b for holding an anchoring line 2 or for guiding a threadable line 3 of the ratcheting tensioning systems 1 (see FIG. 3). The pin shaft 72a, 72b engages and mounts into a first 60a, 60b and a second 12 mounting hole within a respective first 8a, 8b, 8c, 8d and a second 9, 9a, 9b spaced parallel plate member (see FIGS. 7B and 11B). The pin body 70a, 70b, 70c, 70d also includes a pin head 74 at a first end of the pin body 70a, 70b, 70c, 70d connected to the pin shaft 72a, 72b. The pin head 74 includes a grasp 78 for manually rotating the pin body 70a, 70b, 70c, 70d. A pin hole 76 is defined through the pin shaft 72a, 72b proximate a second end of the pin body 70a, 70b, 70c, 70d opposite the first end for removably mounting the cross-pin 80a, 80b.

To employ the attachment system 68a, 68b, 68c, 68d in attaching the anchoring line 2 or in guiding the threadable line 3, the spring element 92 is first pre-installed on the pin shaft 72a, 72b followed by the optional washer 94. In particular, an inner diameter of the spring element 92 and the optional washer 94 are placed over an outer diameter of the pin shaft 72a, 72b at the second end. The second end of the pin shaft 72a, 72b is then inserted through the second mounting hole 12 on the second spaced parallel plate member 9, 9a, 9b (see FIGS. 6B and 11B). Upon the cross-pin hole 76 of the attachment pin body 70a, 70b, 70c, 70d arriving at a position between the first 8a, 8b, 8c, 8d and second 9, 9a, 9b spaced parallel plate members, the cross-pin 80a, 80b is inserted into the cross-pin hole 76 and retained as illustrated in FIGS. 7A-7C and 11A-11C. The attachment pin body 70a, 70b, 70c, 70d, the spring element 92, and the optional washer 94 are retained in the second mounting hole 12 on the second spaced parallel plate member 9, 9a, 9b by the insertion and retention of the cross-pin 80a, 80b into the cross-pin hole 76 by virtue of neither the pin head 74 nor the retained cross-pin 80a, 80b fitting through the second mounting hole 12.

The retention of the pin body 70a, 70b, 70c, 70d, the spring element 92, and the optional washer 94 to the second spaced parallel plate member 9, 9a, 9b and therefore to the ratcheting tensioning systems 1, 1a, 1b prevents these elements from being misplaced. When the anchor attachment system 68a, 68b, 68c, 68d is not engaged in the first mounting hole 60a, 60b, as illustrated in FIGS. 6B and 11B, the retention provides a prominent indicator that the anchor attachment system 68a, 68b, 68c, 68d is not retaining the anchoring line 2 or guiding the threadable line 3. In corresponding prior art systems that allow the removal of an anchoring/guiding pin, no such prominent indication is given.

After the attachment pin body 70a, 70b, 70c, 70d is retained about the second mounting hole 12, the anchoring line 2 or the threadable line 3 are placed in a desired functional position around the pin shaft 72a, 72b as illustrated in FIG. 3. To secure and retain the desired functional anchoring line 2 or threadable line 3 position, the second end of the pin shaft 72a, 72b is further inserted into the first mounting hole 60a, 60b on the first spaced parallel plate member 8a, 8b, 8c, 8d. To accomplish this insertion, the cross-pin 80a, 80b is first aligned with the set of key slots 62a, 62b, 62c included around the first mounting hole 60a, 60b. After this insertion, the cross-pin 80a, 80b is positioned between the set of locking cams 64a, 64b, 64c adjacent the first mounting hole 60a, 60b, and the spring element 92 and optional washer 94 are nestled between the pin head 74 and the second spaced parallel plate member 9, 9a, 9b (see FIGS. 8A-8C and 12A-12C).

To secure and lock the anchor attachment system 68a, 68b, 68c, 68d to the first 8a, 8b, 8c, 8d and second 9, 9a, 9b spaced parallel plate members and thereby securely attach the anchoring line 2 to the tensioning device 1, 1a, 1b or guide the threadable line 3 about the tensioning device 1, 1a, 1b, the pin body 70a, 70b, 70c, 70d is rotated along its axis, preferably by manually turning the grasp 78 of the pin head 74. As illustrated in FIGS. 9A through 9C, rotating the pin body 70a, 70b, 70c, 70d causes the cross-pin 80a, 80b to engage the set of locking cams 64a, 64b, 64c thereby axially moving the pin head 74 towards the second spaced parallel plate member 9, 9a, 9b. This axial movement is resisted by the spring element 92, and the spring element 92 is compressed a distance $H_C$ by the axial movement. The spring element 92 is thereby reduced from an initial height, $H_S$, to a compressed height, $H_S$ minus $H_C$ as illustrated in FIGS. 8A and 9A. Further rotating the pin body 70a, 70b, 70c, 70d causes the cross-pin 80a, 80b to reach and engage a valley 66a, 66b between the set of locking cams 64a, 64b, 64c as illustrated in FIGS. 10A-10C and 13A-13C. The valley 66a, 66b allows the spring element to axially pull the pin body 70a, 70b, 70c, 70d thereby axially moving the pin head 74 away from the second spaced parallel plate member 9, 9a, 9b. This axial movement is induced by the spring element 92, and the spring element 92 is at least partially relieved of compression by the axial movement.

In a preferred embodiment, the spring element 92 is a wave washer, known in the art, with an uncompressed amplitude $H_S$ (see FIG. 8A) ranging from 0.06 inch to 0.25 inch. In a more preferred embodiment, the amplitude $H_S$ of the spring element 92 ranges from 0.10 inch to 0.15 inch. In other embodiments, the spring element 92 may take other forms, such as a coil spring. In still other embodiments, the spring element 92 may be integrated with the first 8a, 8b, 8c, 8d and second 9, 9a, 9b spaced parallel plate members which may elastically flex as the cross-pin 80a, 80b engages the set of locking cams 64a, 64b, 64c and the valley 66a, 66b as described above.

In a preferred embodiment, the set of locking cams 64a, 64b, 64c; the valley 66a, 66b; the set of key slots 62a, 62b, 62c; and the first mounting hole 60a, 60b are stamp formed into the first spaced parallel plate members 8a, 8b, 8c, 8d. In other embodiments, other means may be employed in forming the set of locking cams 64a, 64b, 64c; the valley 66a, 66b; the set of key slots 62a, 62b, 62c; and the first mounting hole 60a, 60b either separately or together and either on or separate from the first spaced parallel plate members 8a, 8b, 8c, 8d. For example, the set of locking cams 64a, 64b, 64c; the valley 66a, 66b; and the set of key slots 62a, 62b, 62c may instead be included on the second spaced parallel plate member 9, 9a, 9b or on a third member that is not necessarily parallel to the first 8a, 8b, 8c, 8d and second 9, 9a, 9b spaced parallel plate members.

After the cross-pin 80a, 80b is positioned and engaged at the valley 66a, 66b between the set of locking cams 64a, 64b, 64c, the anchor attachment system 68a, 68b, 68c, 68d is locked into position and any incidental rotational torque on the pin body 70a, 70b, 70c, 70d is resisted by the cross-pin 80a, 80b reengaging the set of locking cams 64a, 64b, 64c and thereby the spring element 92.

The anchor attachment system 68a, 68b, 68c, 68d may be removed by manually turning the grasp 78 of the pin head 74 thereby causing the reengagement of the locking cams 64a, 64b, 64c by the cross-pin 80a, 80b. Upon the cross-pin 80a, 80b reaching the set of key slots 62a, 62b, 62c, the attachment pin body 70a, 70b, 70c, 70d may be pulled back through and disengaged from the first mounting hole 60a, 60b on the first spaced parallel plate member 8a, 8b, 8c, 8d. Upon the disengagement of the attachment pin body 70a, 70b, 70c, 70d from the first mounting hole 60a, 60b, the anchoring line 2 or threadable line 3 may be removed from and/or repositioned on the ratcheting tensioning systems 1.

To further secure the anchor attachment system 68c, 68d and, in particular, to further prevent the rotation of the attachment pin body 70c, 70d, certain embodiments of the present disclosure include a pin-keeper 95, 95'. In an example embodiment, illustrated in FIGS. 14A through 15C, the pin-keeper 95 is rotatably mounted about a keeper pivot 97 on the first spaced parallel plate member 9a and rotatably moves from a latched position (see FIGS. 14A through 14C) to an unlatched position (see FIGS. 15A through 15C) about a pivot axis 96. A pin head engaging surface 98 on the pin-keeper 95 engages a latching surface 79 on the pin head 74 when the pin-keeper 95 is in the latched position. While in the latched position, the pin head engaging surface 98 of the pin keeper 95 interferes with rotational movement of the pin head 74 and therefore the pin body 70c. The pin keeper 95 is preferably spring-loaded against a keeper stop 99 thereby positioning the pin keeper 95 in the latched position. By preventing rotational movement of the pin body 70c, the cross-pin 80b remains engaged within the valley 66b between the set of locking cams 64b which prevents the attachment pin body 70c from being removed from the first spaced parallel plate member 8b of the tensioning device 1.

In another example embodiment, illustrated in FIGS. 16A through 18D, another pin-keeper 95' is rotatably mounted about a keeper pivot 97', mounted on the first spaced parallel plate member 9b, and rotatably moves from a latched position (see FIGS. 16A through 16D) to an unlatched position (see FIGS. 17A through 18D) about a pivot axis 96'. A pin head engaging surface 98' on the pin-keeper 95' engages a latching surface 79' on the grasp 78 of the pin head 74 when the pin-keeper 95' is in the latched position. While in the latched position, the pin head engaging surface 98' of the pin keeper 95' interferes with rotational movement of the pin head 74 and therefore the pin body 70d. The pin-keeper 95' can be retained by snapping it into the latched position whereupon a hook 99' holds the pin-keeper 95', as illustrated in FIG. 16D. Alternatively, other means may be used to hold the pin-keeper 95' in the latched position. By preventing rotational movement of the pin body 70d, the cross-pin 80a remains engaged within the valley 66a between the set of locking cams 64c which prevents the attachment pin body 70d from being removed from the first spaced parallel plate member 8d of the tensioning device 1.

To disengage the anchor attachment system 68c, 68d from the tensioning tensioning device 1 equipped with the example pin-keeper 95, 95', the pin-keeper 95, 95' is rotatably moved to the unlatched position such that the pin head engaging surface 98, 98' no longer engages the latching surface 79, 79' of the pin head 74 nor interferes with the rotation of the pin body 70c, 70d. In this configuration, the attachment pin body 70c, 70d may be disengaged from the tensioning device 1 as described above.

In a preferred embodiment, the pin-keeper 95, 95' is only moveable to the latched position when the anchor attachment system 68c, 68d is locked into position. A latched but unlocked configuration could be visually misinterpreted as being both latched and locked. As illustrated in FIGS. 18A through 18D, when the anchor attachment system 68d is in the unlocked position, the pin-keeper 95' can not be moved into the latched position. Likewise, the pin-keeper 95 illustrated in FIGS. 15A through 15C can only be placed in the latched position while the anchor attachment system 68c is locked.

In the example embodiments, one or two key slots 62a, 62b, 62c were provided. In other embodiments, more than two key slots may be provided. Likewise, in the example embodiments, the cross-pin 80a, 80b engages the locking cams 64a, 64b, 64c at one or two locations. In other embodiments, more than two locations may be engaged by a cross-pin.

Figure 15B:
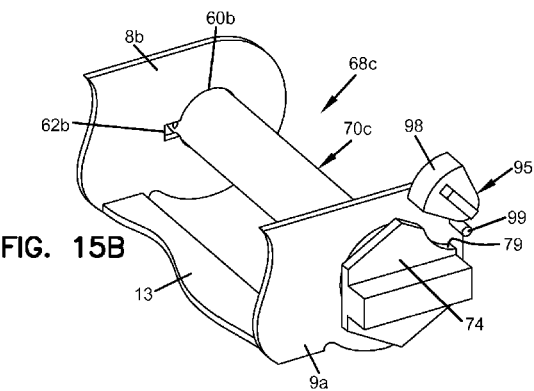
FIG. 15B is a partial perspective view of the example attachment arrangement of FIG. 15A in accordance with the principles of the present disclosure.

In certain stress optimized embodiments, it is preferred to have a single key slot 62b place in a region of relatively low stress as illustrated in FIGS. 11B and 15B.

Other means may be used to secure a pin body to a tensioning device. For example, a set of detent balls 82b is provided on the pin shaft 72b as illustrated in FIGS. 11A through 12C. In certain embodiments, the detent balls 82b engage the hole 60b perimeter to hold the pin shaft 72b in place.

Figure 2A:
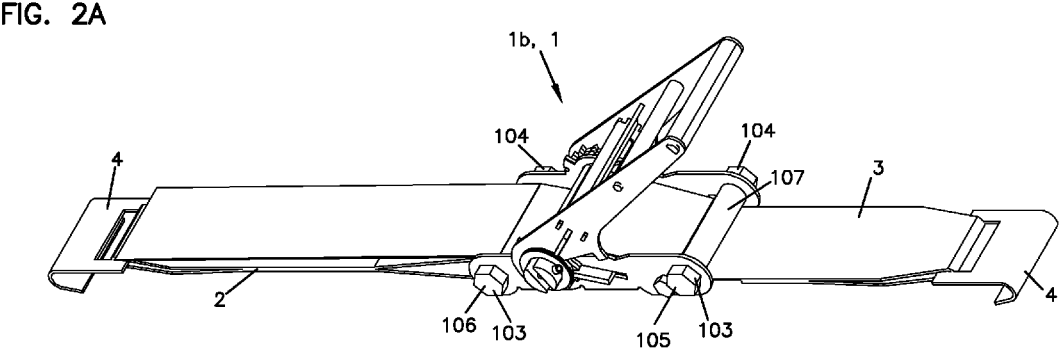
FIG. 2A is a perspective view of an example of the device of FIG. 1 in accordance with the principles of the present disclosure.
Figure 2B:
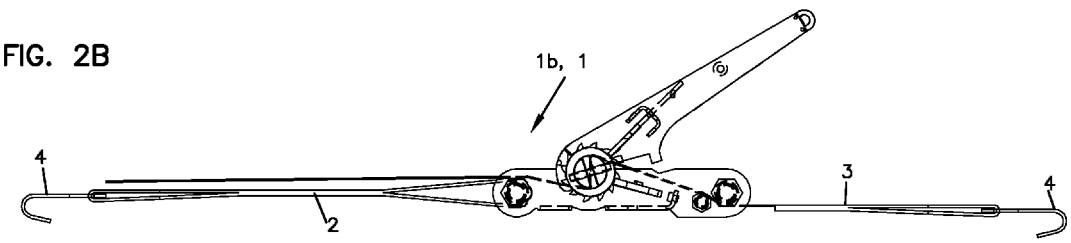
FIG. 2B is an elevational side view of an example the device of FIG. 1 with portions shown in phantom in accordance with the principles of the present disclosure.

Other securing means may include fasteners other than pins. For example, as illustrated in FIG. 2A, a bolt 103 engages a nut 104 thereby providing a first 105 and a second 106 attachment means for the anchoring line 2 and the threadable line 3. A sleeve 107 may be optionally provided around the bolt 103. The nut 104 is attached to the tensioning device 1 and can be permanently attached by, for example, welding. The engagement and disengagement of the bolt 103 from the tensioning device 1 is made easier and/or quicker as the nut 104 does not need to be positioned and held during the engagement and disengagement process.

Still another securing means may include the pin-keeper 95' as illustrated in FIGS. 16A through 17D and described above but without the locking cams 64c, the valley 66a, the key slots 62c, or the cross-pin 80a.

Figure 19:
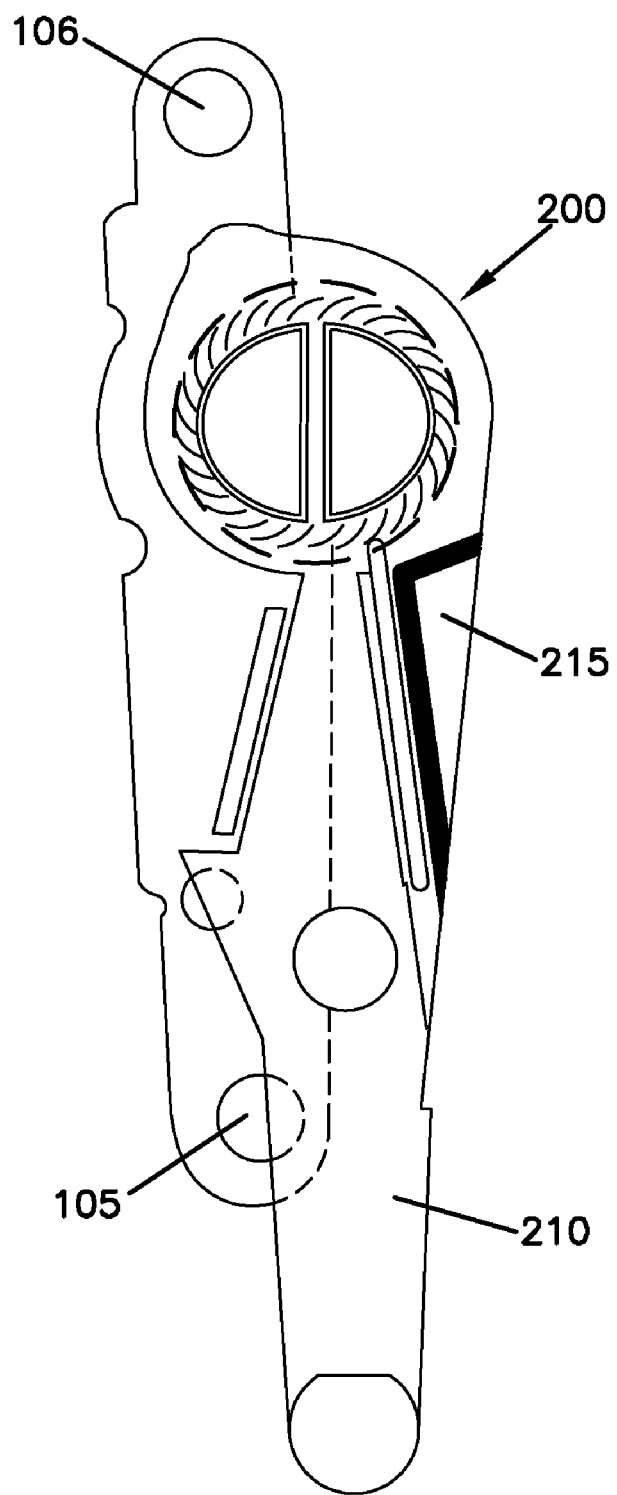
FIG. 19 is a side view of another example of a tensioning device configured in accordance with the principles of the present disclosure.

FIG. 19 is a side view of another embodiment of a tensioning device 200 configured in accordance with the principles of the present disclosure. The tensioning device 200 is shown arranged in a first position in which the handle 210 is pivoted to a first end 201 of the tensioning device 200. In one embodiment, the handle 210 is configured to be pivoted to a second end 202 of the tensioning device 200 as part of a tensioning stroke (i.e., the handle stroke that entrains the ratchet to rotate the drum to tension the tensioning strap). In another embodiment, the handle 210 is configured to be pivoted to the second end 202 in preparation for the tensioning stroke.

Fenders 215 can be provided in the handle 210 to accommodate ends of the anchor members 105, 106. In some embodiments, the fenders 215 also accommodate protrusions on the exterior of the parallel plate members. For example, the fenders 215 can accommodate pin heads 74, cross-pins 80a, 80b, and cams 64a, 64b, 64c, 64d.

Figure 20:
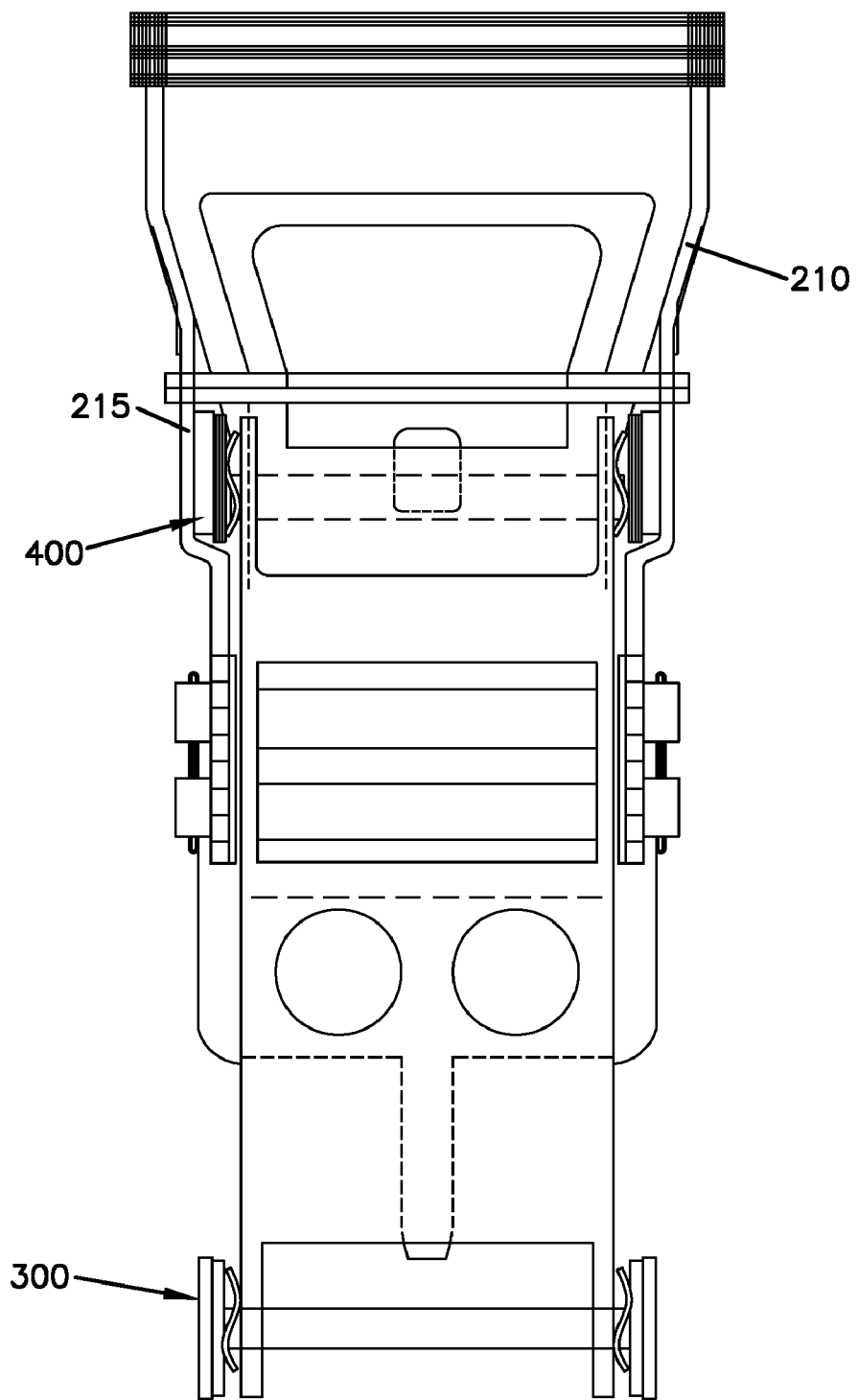
FIG. 20 is a bottom view of the tensioning device of FIG. 19 in which fenders formed in the handle are visible.

FIG. 20 is a plan view of the tensioning device of FIG. 19 arranged in a second position in which the handle has been pivoted to the second end of the tensioning device. The fenders 215 formed in the handle 210 are visible in FIG. 20. In the example shown, a portion of the handle 210 angles outwardly to define a pocket 215 in which the keeper, locking formations, or other parts of the attachment system may be accommodated. In another embodiment, the fenders 215 can be formed by a recess defined in the handle 210.

While particular embodiments of the invention have been described with respect to its application, it will be understood by those skilled in the art that the invention is not limited by such application or embodiment or the particular components disclosed and described herein. It will be appreciated by those skilled in the art that other components that embody the principles of this invention and other applications therefore other than as described herein can be configured within the spirit and intent of this invention. The arrangements described herein are provided as only examples of embodiments that incorporate and practice the principles of this invention. Other modifications and alterations are well within the knowledge of those skilled in the art and are to be included within the broad scope of the appended claims.

What is claimed is:

1. An attachment device for use with a tensioning device for tensioning an anchoring line and a threadable line, the tensioning device defining a first and a second mounting hole, the attachment device comprising:
   i) a line engaging pin including a cross-pin hole, the line engaging pin defining a pin head at one end that is configured to not fit through the mounting holes of the tensioning device;
   ii) a cross-pin mountable in the cross-pin hole, the cross-pin being configured to inhibit the line engaging pin from passing completely through the mounting holes when the cross-pin is mounted in the cross-pin hole;
   iii) a locking cam surface proximate the first mounting hole of the tensioning device; and
   iv) a spring element;
   wherein the cross-pin engages the locking cam surface under force of the spring element to retain the line engaging pin in the first and second mounting holes of the tensioning device.

2. The attachment device of claim 1, wherein the pin head defines a gripping surface by which a user manipulates the line engaging pin.

3. The attachment device of claim 1, further comprising a pin keeper configured to move between a latched position and an unlatched position, the pin keeper defining a pin head engaging surface that is configured to engage a latching surface on the pin head when the pin keeper is arranged in the latched position.

4. The attachment device of claim 3, wherein the pin keeper is spring-loaded into the latched position and is maintained at the latched position by a keeper stop defined on the tensioning device, wherein the pin keeper is moved into the unlatched position from the latched position by overcoming a spring force.

5. A method of switching an anchoring end of a tensioning device including a drum extending between two, spaced parallel plate members, each of the plate members defining a mounting hole at two different ends, at least one of the mounting holes defining a key slot, the method comprising:
   pre-installing a spring element on a first end of a pin shaft, the first end of the pin shaft defining a pin head configured to inhibit passage of the first end of the pin shaft through any of the mounting holes defined in the plate members;
   inserting a second end of the pin shaft through one of the mounting holes defined in a first of the parallel plate members so that the spring element is nestled between the pin head and the first parallel plate member, the pin shaft defining a cross-pin hole;
   inserting a cross-pin into the cross-pin hole when the pin shaft has been inserted sufficient so that the cross-pin hole is arranged between the parallel plate members;
   arranging an anchoring line about the pin shaft;
   aligning the cross-pin with a key slot defined by one of the mounting holes defined in a second of the parallel plate members;
   inserting the second end of the pin shaft through the mounting hole defining the key slot.

6. The method of claim 5, further comprising positioning the cross-pin between a set of locking cams defined at the first mounting hole.

7. The method of claim 6, wherein positioning the cross-pin comprises rotating the pin shaft along a longitudinal axis of the pin shaft.

8. The method of claim 5, further comprising pre-installing a washer on the pin shaft following the spring element.

* * * * *